May 27, 1952

G. K. TEAL

METHOD OF THICKENING RELATIVELY THIN APERTURED METALLIC SCREENS

Filed Dec. 29, 1948

2,598,318

INVENTOR
G. K. TEAL
BY Hugh S. Wertz
ATTORNEY

Patented May 27, 1952 2,598,318

UNITED STATES PATENT OFFICE 2,598,318

METHOD OF THICKENING RELATIVELY THIN APERTURED METALLIC SCREENS

Gordon K. Teal, Summit, N. J., assignor to Bell Telephone Laboratories, Incorporated, New York, N. Y., a corporation of New York Application December 29, 1948, Serial No. 67,916

2 Claims. (Cl. 204—24)

This invention relates to apertured metal plates and more specifically to methods of making such plates suitable for target or screen structures for use in television transmitter tubes.

It his long been recognized in the development of electron camera tubes for generating picture signals at a television transmitting station that there are many advantages in projecting an electron image of the object for transmission onto one side of the screen of the tube and scanning the opposite side of the screen with a cathode ray beam formed in the tube. An example of a camera tube employing such a "two-sided" target or screen is the so-called "image orthicon" tube described in an article entitled "The Image Orthicon—a Sensitive Television Pick-Up Tube" by Albert Rose, Paul K. Weimer, and Harold B. Law, appearing in the July 1946 issue of the Proceedings of the I. R. E., beginning on page 424. The two-sided target makes possible the separation of charging and discharging processes so that the sensitizing procedure and electric fields appropriate to each may be utilized in the tube without mutual interference. The target must conduct charges between its two sides or surfaces but not along either surface. Moreover, it should have a conducting element therein or nearby to act as the common capacitor plate for the separate picture elements. It has been found very difficult to construct satisfactorily commercial targets of this type.

It is an object of the present invention to provide novel and improved methods for making apertured metal plates suitable for use in making two-sided electron camera tube targets which have a large number of elemental discrete conducting elements per square inch.

It is another object of this invention to thicken relatively thin apertured metallic screens.

In accordance with exemplary methods in accordance with the invention, relatively thin apertured metallic screens are thickened by electroplating. Various procedures are employed to prevent electro-plating the interiors of the apertures. One of the thickened screens can be used to prepare a rubber master from which additional screens can be made.

Figure 1:
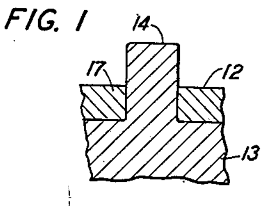
Figure 2:
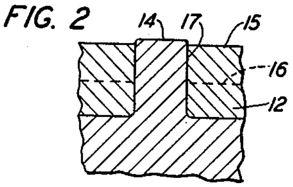
Figure 7:
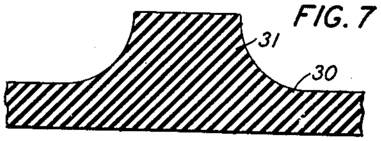
Figure 8:
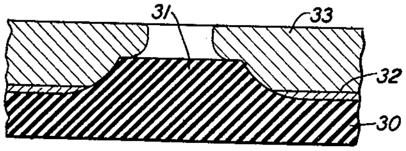
Figure 9:
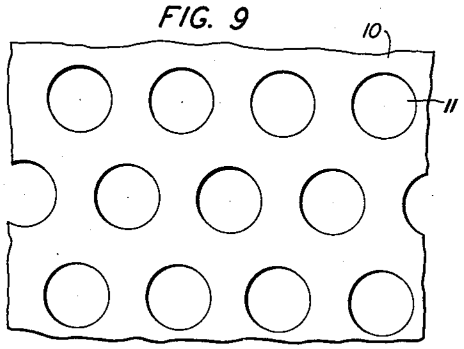

The invention will be more readily understood by referring to the following description taken in connection with the accompanying drawing forming a part thereof in which:

Figs. 1 and 2 illustrate various steps in a process, in accordance with the invention, of preparing a thick screen containing a multiplicity of apertures therein;

Figs. 3 to 6, inclusive, illustrate various steps in another method of preparing thick, apertured metallic screens;

Figs. 7 and 8 illustrate steps in still another method of preparing a thick, apertured metallic screen; and Fig. 9 is a top view of a schematic representation, in greatly enlarged form, of a target made by any of the methods in accordance with the invention.

Referring more specifically to the drawing, Fig. 9 shows, by way of example for purposes of illustration, portions of an apertured metallic screen 10 which is suitable for use in the preparation of a two-sided mosaic target which can be used in certain television transmitting tubes, such as for example the "image orthicon" type of tube referred to above. As an example of a specific method of making a "two-sided" mosaic target utilizing an apertured metallic screen made in accordance with the present invention, reference is made to a co-pending application of the present inventor, Serial No. 67,914, filed December 29, 1948. It will be understood that Fig. 9 is merely a schematic showing and the same applies to the other figures in the drawing. Obviously the apertures 11 in the screen 10 do not have the smooth cylindrical surfaces shown.

The first two figures of the drawing illustrate schematically one method of forming a thick, apertured metallic screen. As shown in Fig. 1, a metal screen 12, such as nickel, for example, and thinner than the screen 10 that is intended to be produced by this process, is stretched tightly upon a wax block 13 or upon a wax coated piece of metal. Sufficient tension is applied to cause the wax to be pushed through the holes of the screen as indicated by the raised portions 14 in Fig. 1. Additional metal 15, shown above the dashed line 16 in Fig. 2 but which is firmly attached to the metal screen 12, is then electroplated upon the screen 12. This process can be repeated as many times as necessary to produce a thicker screen than the one started with.

A variation of the above process is (instead of using a wax block) to blow air through the screen 12 during the electro-plating or to back the screen 12 with air or other fluid under slight pressure to form bubbles or obstructions in the apertures 17 in the screen, which apertures 17 correspond in position to the apertures 11 in the final screen 10 shown in Fig. 9.

Figure 3:
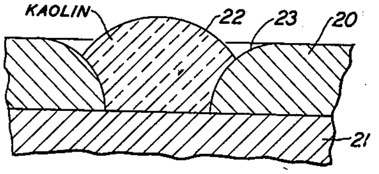
Figure 4:
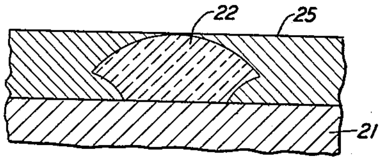
Figure 5:
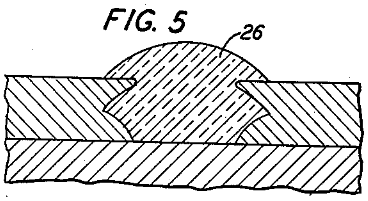
Figure 6:
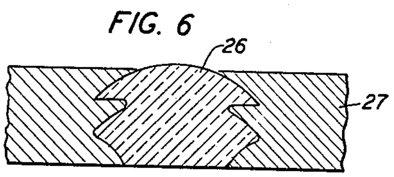

Another method of forming a thick metallic apertured screen from a thin one is illustrated in Figs. 3 to 6, inclusive. In this process a perforated nickel screen 20 is placed in contact with a filter cylinder 21, this cylinder being made of porous material such as sintered glass or glass blocks having a multiplicity of capillary holes therein. A vacuum is applied to the inside of the cylinder 21 and a suspension of kaolin, nickel oxide, or glass in water is poured upon the screen to form non-conducting buttons 22 in the hole 23 of the screen as indicated in Fig. 3. Nickel is then electro-plated upon the nickel screen 20 of Fig. 3 to produce the thicker screen 25 indicated in Fig. 4. Additional kaolin or other solid is filtered through the screen 25 to form the buttons 26 shown in Fig. 5. Additional nickel is then electro-plated upon the screen to obtain a thick perforated screen 27 as shown in Fig. 6. The above procedure can be repeated as many times as necessary to give the desired screen thickness. The non-conducting buttons are removed with any suitable solvent such as hydrofluoric, hydrochloric, or nitric acid. By protecting the outside surfaces of the screen and etching the metal in the holes, it is possible to obtain smooth holes through a thick screen. The smooth holes are represented by the holes 11 in Fig. 9.

Figs. 7 and 8 illustrate another method of producing a thick metal screen. Referring now to Fig. 7, a rubber master 30 is prepared by using an apertured nickel screen that has been thickened by the process shown in Figs. 1 and 2 or Figs. 3 to 6, inclusive, for example. This master is prepared by pouring rubber in the holes in the screen. The forming agent is then dissolved with acid or stripped off. The thickened metallic screen can be previously electrolytically polished so that the rubber master 30 has roughness eliminated as much as possible. It will be understood that the rubber master 30 shown in Figs. 7 and 8 represents only one rubber post and there are of the order of 400 such posts per linear inch in a complete master.

A conducting coat 32 of aquadag or a metal is then deposited on the rubber master 30. The coating is dissolved or wiped off the post 31. Thick metal screens 33, of nickel for example, are then electro-plated upon the master 30 as indicated in Fig. 8. The finished metal screen 33 can be stripped off without difficulty due to the elasticity of the rubber master 30.

Various changes can be made in the embodiment described above without departing from the spirit of the invention, the scope of which is indicated in the claims.

What is claimed is:

1. A method of preparing a relatively thick metal screen having a multiplicity of tiny apertures therethrough of substantially the same size from a thin metal screen having the same number of apertures, which comprises the steps of applying suction to one end of each of the apertures in said thin screen while applying a suspension of non-conducting particles in water in the other end thereof, thereby forming non-conducting buttons therein which project above the surface of the screen to which the suspended particles are applied, electroplating metal on said thin screen to almost cover the projecting portions of said buttons and form thereby said thick screen, dissolving the buttons in solvent, and etching the metal in the apertures of said thick screen to smooth said apertures.

2. A method of preparing a relatively thick metal screen having a multiplicity of tiny apertures therethrough of substantially the same size from a thin metal screen having the same number of apertures, which comprises the steps of applying suction to one end of each of the apertures in said thin screen while applying a suspension of non-conducting particles in water in the other end thereof, thereby forming non-conducting buttons therein which project above the surface of the screen to which the suspended particles are applied, electroplating metal on said thin screen to almost cover the projecting portions of said buttons and form thereby an intermediate screen which is thicker than said thin screen but not as thick as said thick screen, applying non-conducting material to said buttons to form heads therein which project above the surface of the intermediate screen, electroplating additional metal on said intermediate screen to almost cover the projecting portions of said heads and form thereby said thick screen, dissolving all non-conducting material in solvent, and etching the metal in the apertures of said thick screen to smooth said apertures.

GORDON K. TEAL.

REFERENCES CITED

The following references are of record in the file of this patent:

UNITED STATES PATENTS

| Number | Name | Date |
|---|---|---|
| 1,311,275 | Harrison | July 29, 1919 |
| 2,166,367 | Norris | July 18, 1939 |
| 2,225,733 | Beebe | Dec. 24, 1940 |